Feb. 16, 1965  F. KUGEL  3,169,371
FLUID FLOW TRANSMISSION, ESPECIALLY FOR RAIL VEHICLES
Filed Oct. 3, 1960  4 Sheets-Sheet 1

Feb. 16, 1965 F. KUGEL 3,169,371
FLUID FLOW TRANSMISSION, ESPECIALLY FOR RAIL VEHICLES
Filed Oct. 3, 1960 4 Sheets-Sheet 3
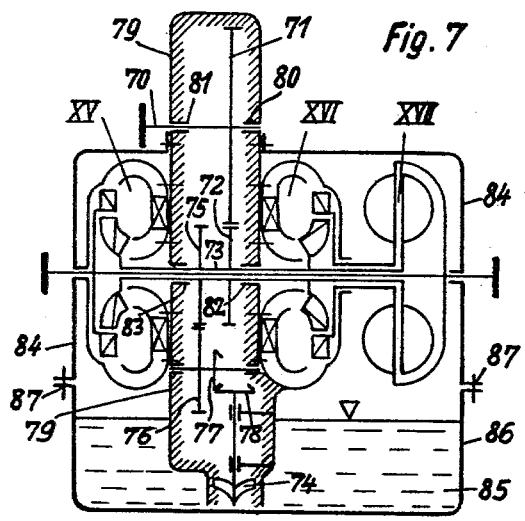
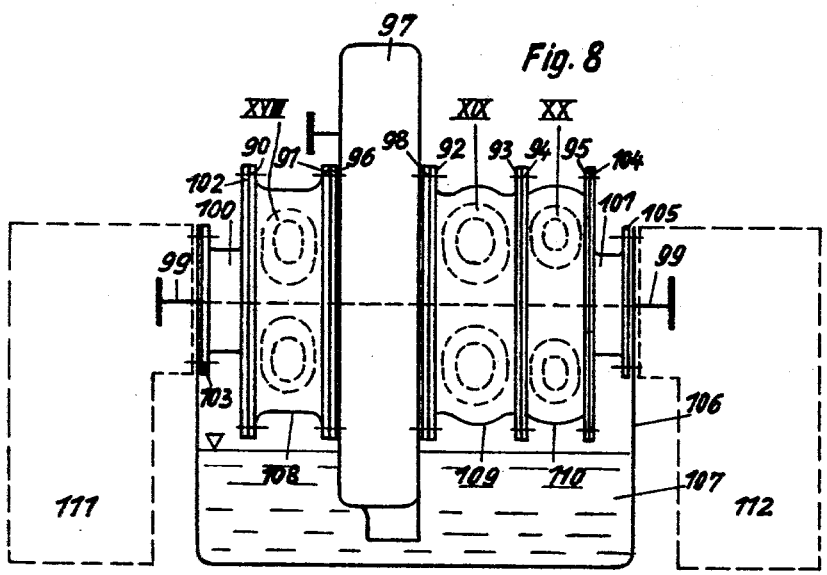

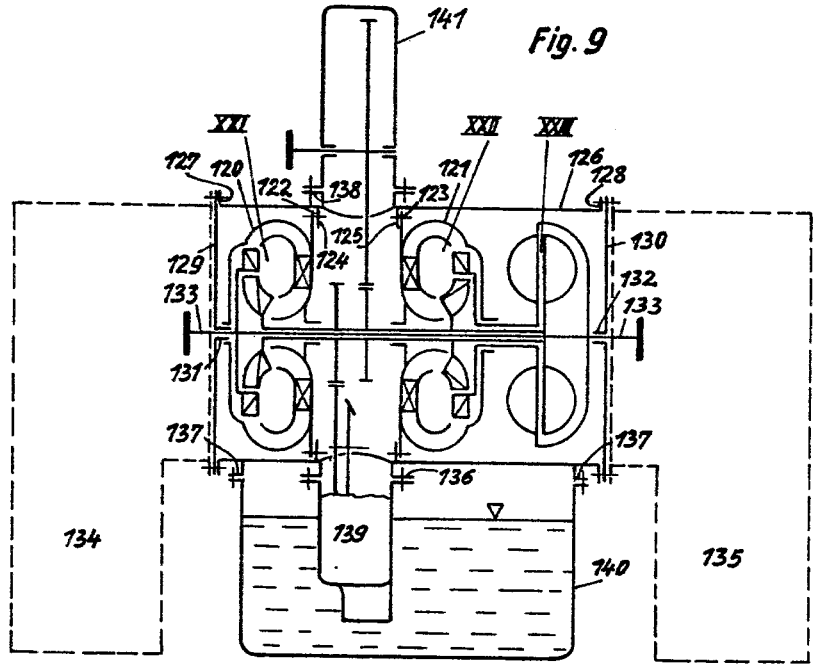

United States Patent Office 3,169,371
Patented Feb. 16, 1965

3,169,371
FLUID FLOW TRANSMISSION, ESPECIALLY FOR RAIL VEHICLES
Fritz Kugel, Heidenheim (Brenz), Germany, assignor to J. M. Voith, G.m.b.H., Heidenheim (Brenz), Germany
Filed Oct. 3, 1960, Ser. No. 60,089
Claims priority, application Germany, Oct. 9, 1959, V 17,372
15 Claims. (Cl. 60—54)

The present invention relates to a fluid flow transmission with at least two axially located adjacent fluid flow circuits, which, while not being limited to, is particularly suitable for rail vehicles, and in which for purposes of obtaining a plurality of velocity ranges, a corresponding number of fluid flow circuits is employed. Such circuits may be made effective or ineffective for instance by filling and discharging respectively. Depending on the particular required conditions of operation, combinations of a plurality of turbo-torque converters or of turbo torque converters and turbo couplings may be employed.

The requirement for higher driving speeds and thus for higher outputs also makes it more and more urgent to decrease the space requirement. Furthermore, in conformity with the modern tendency to increase the economy of operation, a universal applicability of the fluid flow transmissions with various drives and the standardization of the driving elements is required in order to be able to obtain a reduction in the manufacturing and stock holding costs and also to obtain a decrease in the delivery time and to facilitate the servicing by reducing the number of the replacement parts and sizes.

With fluid flow transmissions comprising a plurality of fluid flow circuits, it has heretofore not been possible as a rule to make up different drives of machines by means of a single transmission type without requiring a considerable number of additional elements, nor has it been possible heretofore to employ standardized transmission elements in order to make up different drives in conformity with the building block principle.

A heretofore known construction of a fluid flow transmission of the above mentioned type furnished the possibility of a power takeoff at both sides in order to obtain the required direction of rotation for the respective machine, and in order to be able with different vehicle types simultaneously to drive a plurality of driving axles. This possibility was created by a counter shaft extending all the way through and parallel to the axes of the fluid flow circuits, the various fluid flow circuits being drivingly connected to said counter shaft by means of spur gears. As a rule, the said counter shaft was located below the fluid flow circuits.

However, the counter shaft and spur gears presented a considerable increase in the cost of construction, and the spur gears on the counter shaft made it more difficult to mount an appropriate oil sump and required for instance a correspondingly large transmission housing. A quick defoaming of the oil caused to foam in the circuits is obtainable by a sufficiently large coherent surface of the oil. If, however, the spur gears extended below the oil level, partitions had to be provided which naturally decrease the coherent oil surface level. The spur gears must, of course, not run directly in the oil sump in order not to cause an additional foaming.

Furthermore, in order to be able to absorb the gear forces occurring between the circuits and the counter shaft it is necessary to design the housing relatively strong and heavy which, of course, increases the overall weight of the installation. The distance between the adjacent circuits and the counter shaft is determined by the diameter of the largest circuit which in turn affects not only the size of the housing but in certain circumstances causes too high circumferential speed of the spur gears.

It is, therefore, an object of the present invention to provide a fluid flow transmission of the above mentioned general type, which will overcome the drawbacks outlined above.

It is another object of this invention to provide a fluid flow transmission with at least two coaxially arranged adjacent fluid flow circuits, which will not require the heretofore known counter shaft with the bearings therefor and which will furnish the possibility of a power takeoff at both sides without requiring any material changes.

It is a further object of this invention to provide a fluid flow transmission as set forth in the preceding paragraph, which will not require the heretofore customary spur gear transmissions between the secondary shafts of the circuits and the counter shaft.

It is a still further object of the invention to provide a fluid flow transmission with at least two coaxially arranged adjacent fluid flow circuits, which will have a considerably narrower and shorter transmission housing than heretofore known fluid flow transmissions of the type involved while the lower part of the housing may be made lighter inasmuch as the forces between the fluid flow circuits and the counter shaft, which heretofore had to be absorbed by the housing, will have been eliminated.

These and other objects and advantages of the invention will appear more clearly from the following specification in connection with the accompanying drawings, in which:

FIG. 1 diagrammatically illustrates a longitudinal section through a two-velocity transmission with two fluid flow converters and a central secondary shaft in conformity with the present invention.

FIG. 7 is a diagrammatic longitudinal section through a three-velocity transmission according to the invention with a separate intermediate piece for the driving gears and the drive for the filling pump.

FIG. 8 is a diagrammatic longitudinal section through a three-velocity transmission according to the invention built in conformity with the building block principle.

FIG. 9 is a diagrammatic longitudinal section through a three-velocity transmission in conformity with the invention according to which the circuits are arranged in a cylindrical transmission housing.

General arrangement

The above mentioned objects have been realized by a fluid flow transmission according to the present invention which has at least two coaxially and adjacently arranged fluid flow circuits adapted to operate in the same direction of rotation and also adapted to be made effective and ineffective for the various velocity ranges, said fluid flow transmission being characterized in that the primary wheels are mounted on a common primary shaft. This primary shaft is in its entirety designed as a hollow shaft and is driven through the intervention of a gear pair, preferably a step-up transmission, arranged between two fluid flow circuits. Furthermore, the secondary gears of all fluid flow circuits are rigidly connected to a single central secondary shaft substantially surrounded by the primary shaft. Finally, a power take-off at one or both sides is passed directly and coaxially from the secondary shaft through a transmission housing housing said circuits.

Thus, the counter shaft customary with heretofore known fluid flow transmissions of the general type involved and the bearings for said counter shaft have been replaced by the central secondary shaft from which the power takeoff may be taken selectively at one or simultaneously at both sides. Thus, the costs of production and the overall size of the housing will be considerably reduced and the oil sump can be designed more favorably inasmuch as no spur gears will extend into the oil sump. Thus, a sufficiently large coherent surface will be made possible which in its turn will bring about a faster de-foaming of the oil. The lower portion of the housing may be made considerably lighter, for instance a container of thin sheet metal may as oil sump be flanged from below to the heavier upper portion of the housing.

Structural arrangement

Figure 1:
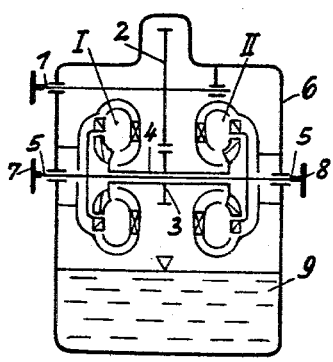

If the fluid flow transmission comprises one or two torque converters, expediently known torque converter types with a primary wheel, a radial turbine wheel outside said primary wheel and a guide wheel are employed in such a way that the primary wheel and the secondary wheel will be arranged on that side which is remote from the gear pair. Such an arrangement is shown in FIG. 1 illustrating a two-velocity fluid flow transmission with two torque converters. For purposes of obtaining different transmissions, the torque converters are respectively provided with different blading. The converters I, II are adapted to be driven through the intervention of an input shaft 1, a step-up transmission 2, 3 and a primary shaft 4 designed as hollow shaft. The secondary parts of the two converters are connected to a central secondary shaft 5 which extends from a transmission housing 6 at both ends and is provided with output flanges 7, 8. Thus, the output may be effected individually at one or the other side or may be effected simultaneously at both sides. The lower portion of the housing 6 contains on oil sump 9 with a coherent straight oil level.

Figure 2:
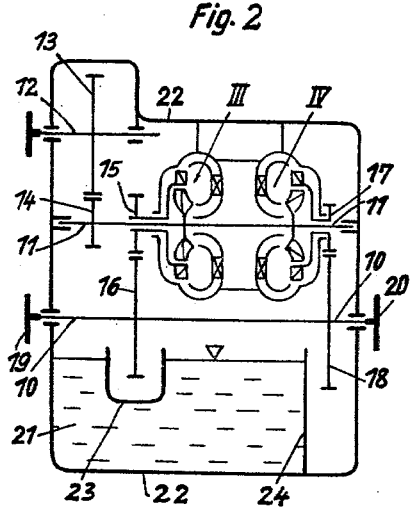
FIG. 2 is a diagrammatic section through a heretofore known two-velocity transmission with two fluid flow converters and a counter shaft.

In order to compare the arrangement according to the invention as shown in FIG. 1 with a corresponding heretofore known arrangement, FIG. 2 shows a heretofore known two-velocity transmission with two converters III and IV but with a counter shaft 10. The drive is effected from the input shaft 12 through spur gears 13 and 14 to a central primary shaft 11. The primary parts of the converters are driven by the primary shaft 11, and the output is effected through the secondary parts of converter III and spur gears 15, 16, converter IV, spur gears 17, 18 and counter shaft 10. The output may be effected at both sides through the intervention of the flanges 19, 20.

As will be seen from FIG. 2, the gears 16, 18 extend into the oil level of a sump 21 which is provided in a housing 22 housing the entire fluid flow transmission. In order not to have the gears 16, 18 extend into the oil, partitions 23, 24 are provided. These partitions not only reduce the oil sump but also prevent the formation of a sufficiently large coherent oil level. The transmission housing 22 absorbs the bearing forces of shafts 10, 11, 12 and, therefore, has to be constructed correspondingly heavy.

A comparison of the transmission of the invention according to FIG. 1 with the heretofore known transmission of FIG. 2 clearly shows the advantages of the transmission according to the invention. These advantages consist primarily in that the number of transmission elements and thereby the cost of production have been reduced. Furthermore, the transmission housing in spite of retaining the dimensions of the fluid flow circuits has become considerably smaller, and the housing has to absorb less forces so that it can be designed considerably lighter. In addition thereto, the oil sump can be located higher and forms a sufficiently large coherent surface.

Figure 3:
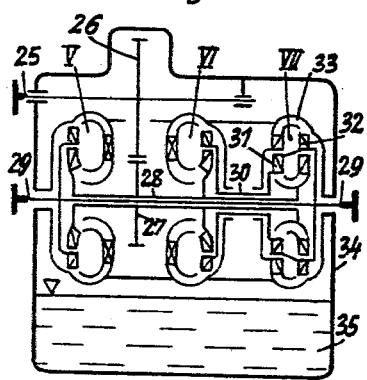
FIG. 3 represents a diagrammatic section through a three-velocity transmission with three fluid flow converters and a central secondary shaft in conformity with the present invention.

With a fluid flow transmission having three coaxial and adjacently located fluid flow circuits, according to a further development of the invention, the secondary wheels of the two outer circuits are directly connected to the central secondary shaft. Furthermore, the secondary wheel of the intermediate circuit is, by means of a primary shaft partially surrounding the hollow shaft, connected to the secondary wheel of that circuit which when looking in the direction from the drive of the common primary shaft is located on the same side. In this connection, it is advantageous to provide the third fluid flow circuit, provided it is represented by a converter, with a two-stage secondary wheel one part of which is connected with the secondary part of the intermediate circuit through a hollow shaft while the other part of said two-stage secondary wheel is directly connected to the secondary shaft. The said two-stage secondary wheel makes possible the drive through the housing of the third fluid flow circuit. Such fluid flow transmission with three converters V, VI, VII is shown in FIG. 3. As will be seen therefrom, an input shaft 25 drives spur gears 26 and 27 which in their turn drive a hollow primary shaft 28 common to all converters. The secondary wheel of the converter V is directly connected to a central secondary shaft 29. The secondary shaft of converter VI is, through a hollow shaft 30 surrounding the hollow primary shaft 28, connected to the left stage 31 of the secondary wheel 31, 32 of converter VII. The secondary blading of converter VII is a two-stage blading and comprises two secondary blading rings 31 and 32 connected to each other. The secondary wheel 31, 32 is directly drivingly connected to the central secondary shaft 29. The two-stage secondary blading of this arrangement of the fluid flow circuits namely with two directly adjacent converters, represents a constructional possibility in order to allow the secondary part of converter V together with the secondary part of converter VII to be passed within the stationary housing 33 of converter VII to the secondary shaft. Moreover, the two-stage secondary wheel 31, 32 also makes possible over the other converters to obtain a different transmission ratio. An oil sump 35 is connected to the lower part of the transmission housing 34. This so-called through-drive converter may be employed as third velocity range for increasing the speed of this transmission system. As third velocity range, the converter allows a simple exchangeability over such transmissions in which alternatively a coupling is employed as third velocity range. On the other hand, it will be obvious that improved degrees of efficiency for such through-drive converter are obtainable when the converter is employed in a different design as secondary velocity range.

Figure 4:
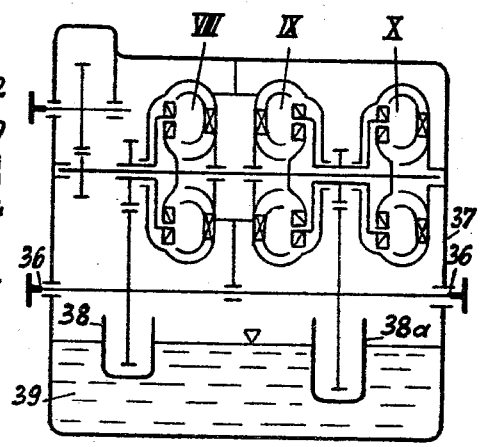
FIG. 4 represents a diagrammatic longitudinal section through a heretofore known three-velocity transmission with three torque converters and a counter shaft.

FIG. 4 represents a heretofore known three-converter transmission. The fundamental construction of this heretofore known three-converter transmission corresponds to that of FIG. 2. The secondary wheel of the converter VIII is directly drivingly connected to a counter shaft 36. The secondary wheels of the converter IX and X are coupled to each other and drivingly connected to the counter shaft 36 through a pair of spur gears. The two converters IX and X have also here to be associated with different velocity ranges. Partitions 38, 38a connected to a housing 37 prevent the spur gears of the counter shaft from running in the oil sump 39. A comparison of FIG. 3 showing a three-converter transmission according to the invention with FIG. 4 showing a three-converter transmission as it was heretofore known, clearly indicates the advantages of the transmission according to the invention over heretofore known transmissions of the type involved with regard to costs of construction, weight, gear wear and gear noises as well as with regard to the arrangement of the oil sump.

Figure 5:
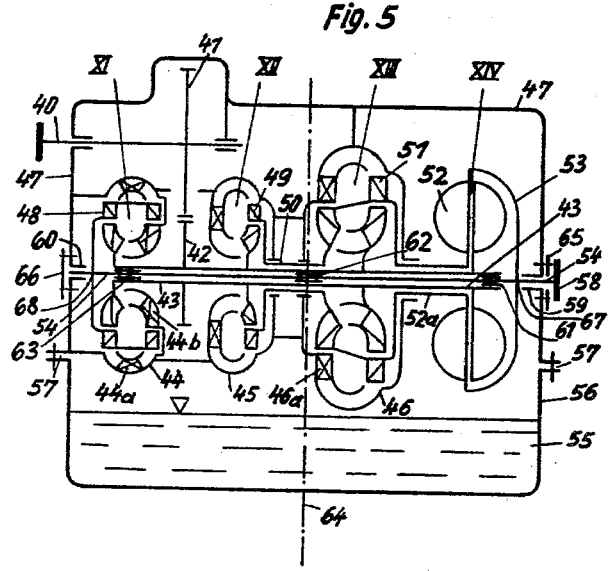
FIG. 5 shows a diagrammatic longitudinal section through a four-velocity transmission according to the invention with three fluid flow converters and a fluid coupling, a central secondary shaft, and a power output toward the right-hand side with regard to the drawing.

It is further advantageous for the lowermost velocity range to employ a converter with two secondary wheel stages and if desired also with two guide wheel stages. In this way, a sufficient torque conversion will be obtained during the starting period. Such a transmission is shown in FIG. 5 which represents a fluid flow transmission with four velocity ranges. Three velocity ranges XI, XII, and XIII are designed as torque converters, whereas the fourth velocity range is designed as coupling XIV. The drive is effected through the intervention of a shaft 40, gears 41, 42 and a primary shaft 43 representing a hollow shaft. This primary shaft 43 has drivingly connected thereto the primary parts of all circuits. The housings 44, 45, 46 of the three converters are fixedly connected to a transmission housing 47.

Converter XI has a two-stage guide wheel 44a, 44b and a two-stage secondary wheel 48. It is particularly good for the starting because it brings about particularly high torque conversion for which reason in this instance it is employed as lowermost velocity range. The secondary wheel 49 of the converter XII is connected to the two-stage secondary wheel 51 of converter XIII through the intervention of a hollow shaft 50. Inasmuch as a coupling stage is additionally provided, the secondary part of converter XIII is arranged within and passed through the stationary guide wheel 46a. At the same time, by means of this two-stage converter, a different transmission ratio is obtained over the other converters. The secondary wheel 51 of converter XIII is furthermore through a hollow shaft 42a connected to the secondary wheel 52 of coupling XIV. The secondary wheel 52 is by means of a bowl 53 connected to a central secondary shaft 54 having drivingly connected thereto the secondary part 48 of converter XI.

The oil sump 55 is provided in a separate oil container 56 which, by means of a flange 57, is connected to the transmission housing 47 and is of a light design.

For purposes of further employing the building block principle to transmissions according to the present invention, it is suggested with a fluid flow transmission having an output at one side only, to design the central secondary shaft with regard to its bearings and its connection with the secondary wheels directly connected thereto, in a symmetrical manner with regard to a plane perpendicular to the axis of said central secondary shaft. The central secondary shaft may with the said fluid flow transmission selectively be employed for the output at one of the two sides while employing one design only of the secondary shaft with one design only of the two housing bearings and with one design only for the bearing lid without requiring any changes of the parts. The central secondary shaft 54 has one end provided with an output flange 58. The output is effected on the right-hand side with regard to the drawing. In order to be able to drive the output from the other side, the bearings 59, 60 of the shaft 54 are uniform. The bearings 61, 63 between the hollow primary shaft 43 and the central secondary shaft 54 are symmetrically arranged with regard to a plane 64 perpendicular to the axis of rotation of the converters. One bearing 62 is cut by the said plane in the center thereof. This plane 64 is arranged in the center of the housing 47 and of the container 56. Similarly, the secondary parts 48, 53 of converter XI and coupling XIV respectively are connected to the central secondary shaft 54 at points 67, 68 symmetrically with regard to the plane 64. The diameters of the central secondary shaft 54 at points 67 and 68 are of the same magnitude. Two bearing flanges 65, 66 differ from each other merely in that flange 65 has a bore therethrough which exceeds the diameter of shaft 54 at the passage therefor.

Figure 6:
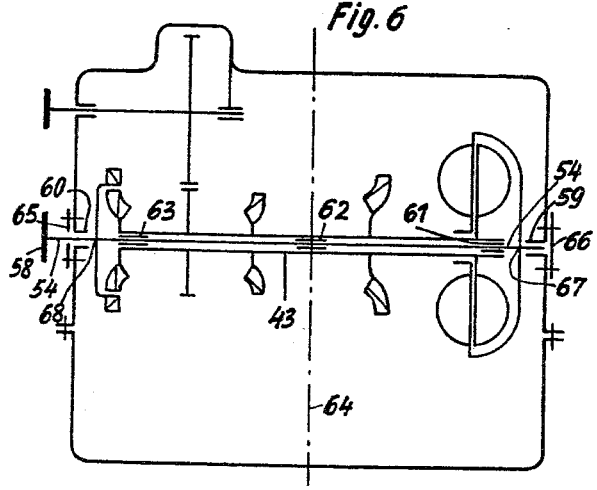
FIG. 6 illustrates a simplified version of the transmission of FIG. 5 with an output toward the left-hand side.

FIG. 6 represents the fluid flow transmission according to FIG. 5 in a simplified form and with a different possibility for the takeoff of the output. The output through flange 58 will now be taken off at the left-hand side. The required change in the fluid flow transmission concerns merely a somewhat different mounting while maintaining the same details. More specifically, the central secondary shaft 54 is merely mounted in a reverse manner corresponding to the new output side. Inasmuch as the two bearings 59 and 60 are the same, the bearings 61 and 63 for the hollow shaft 43 and the connection of the secondary parts at the points 67 and 68 are each designed symmetrically with regard to plane 64 and are of the same magnitude so that the said change can be effected without any difficulties. The bearing flanges 65, 66 are exchanged which exchange is possible in view of the same connecting measurements without requiring further alterations. An advantageous construction of the fluid flow transmission according to the invention furthermore consists in that between the two fluid circuits between which the driving pair of gears is located, the drive for the filling pump and preferably for the control means for the filling control of the fluid flow circuits is provided. Due to the fact that the filling pump and the control means therefor are provided at this certain point, a further simplification of the construction will be obtained. It will then be possible, independently of the various possibilities of combination of the fluid flow circuits, to provide each time the same parts for the filling device.

According to a further feature of the invention, the bearings of the driving gears at both sides, and preferably the bearings of the drive for the filling pump are arranged in one housing wall each which two housing walls are located between the fluid circuits adjacent the driving gear wheels. These two housing walls also comprise bearings for the hollow primary shaft. The occurring transmission forces will be absorbed in these walls and will not any longer exert a load upon the transmission housing surrounding the circuits so that the transmission housing may be lighter designed. The primary and secondary shaft may likewise be designed lighter because now a stable support at both sides of the driving wheel on the primary shaft has been added.

For purposes of solving the further problem underlying the present invention namely to create a fluid flow transmission which may be composed to a great extent of standardized elements, the housing walls between the two circuits are designed as separate intermediate piece. This intermediate piece, which absorbs all gear forces of the transmission, is so designed that it may be inserted into the transmission housing and there connected thereto.

In further developing the invention, the stationary housing of the fluid flow circuits, the separate intermediate piece and preferably a housing for the end bearings of the central secondary shaft are so designed that these parts may be connected to each other as installation units, preferably by means of flanges at the two end sides of these parts, all of said flanges having the same diameter. Furthermore, these parts are designed strong and are combined to a supporting building unit of a fluid flow transmission, for instance by connecting the same by means of screws. Preferably, a housing containing the oil sump is produced as a relatively light unit and is connected to said building unit.

More specifically referring to FIG. 7, the transmission illustrated therein represents a three-velocity transmission with two converters XV, XVI and a coupling XVII. The space betwene the converters XV, XVI of this arrangement receives not only one drive shaft 70 and spur gears 71, 72 drivingly connected to a hollow primary shaft 73 but also the drive for a filling pump 74 which latter is driven through the intervention of gears 75, 76, 77 and 78. In the said space there is provided a separate support or intermediate member 79 supporting the mentioned parts. The drive shaft 70 is journalled in bearings 80, 81, whereas the hollow primary shaft is journalled in bearings 82, 83. Inasmuch as these bearings 80 to 83 are arranged in the intermediate member 79 indicated in FIG. 7 by marginal shading, the gear forces will be absorbed within the strong intermediate member 79. The housing 84, which surrounds the fluid circuits, may accordingly be of a light construction. An oil trough 86 confining the oil sump 85 is connected to housing 84 by flanges 87. Said oil trough 86 may likewise be of light construction.

As will be evident from the above, the above mentioned construction of the fluid circuit represents a further step along the building block principle. The torque converters merely have to be placed alongside each other and to be connected to each other. Any fluid coupling which may be employed is bridged by a flanged housing. A separate transmission housing for absorbing the transmission forces is completely superfluous. All forces occurring at the power intake and power output end and within the circuits are all absorbed by this building unit. The supporting parts are designed of corresponding strong construction, for instance the walls of the circuit housings may be reinforced. The outer appearance and appeal may be improved by cylindrically designed housings. The subsequent transmission is mounted on one of the two end faces of the building unit. Inasmuch as the flanges expediently have the same diameter, and also the same diameter for the bores through which the connecting bolts are to be passed, a further standardization of the transmission will be obtained.

It is even possible to adopt one or a few standard diameters for all occurring circuits so that a great possibility of combinations will be obtained with few types of circuits only which, of course, will greatly aid in the mass production of these parts and in the reduction of the production costs. Circuits of greatly varying sizes may, for instance, by means of adapter rings be built together to a fluid flow transmission. The intermediate member with the driving gears and the filling pump drive will, of course, be included in this standardization of the flange diameters. The same applies to the housing for the end bearings of the secondary shaft.

Another combination possibility of fluid flow transmissions is obtained by providing the stationary housings of the fluid circuits, which housings have normal wall thickness, with a connecting flange and by designing these housings with said flanges so that they may be mounted in a cylindrical one-piece supporting transmission housing provided with corresponding flanges. Furthermore, both end faces of the housing may be provided with uniform screw-on surfaces for selectively connecting the subsequent transmission at either one of the end faces. The input gears and the filling pump drive may be arranged in separate housings, and these housings and preferably a container for the oil sump may be connected to the cylindrical transmission housing. The cylindrical housing is so designed that it will absorb all transmission forces. The installation of the individual circuits will then be effected in a very simple manner, particularly when also in this instance the flange diameter is standardized. The simple installation possibility of the circuits and the flanging of the input housing and of the filling pump drive housing introduce a great flexibility as to the possible variations and contribute materially to a considerable standardization.

More specifically, referring to FIG. 8, this figure shows a three-velocity drive with three torque converters XVIII, XIX and XX. These converters are, adjacent the stationary housing parts 108, 109, 110, provided with flanges 90, 91, 92, 93, 94 and 95 by means of which they are connected to the adjacent parts likewise provided with a flange. Thus, flange 21 of converter XVIII is connected to flange 96 of an intermediate member 97 which comprises the input and the filling pump. The other flange of the intermediate member 98 is connected to flange 92 of converter XII. Flange 93 of the same converter is screwed to flange 94 of converter XX. The journalling of a central secondary shaft 99 permitting the output to both sides is mounted in the bearing housings 100, 101 the flanges 102 to 105 of which are connected with the corresponding flanges of converter XVIII and XX and of a housing 106 of light construction which housing contains the oil sump 107.

The fluid flow transmission according to FIG. 8 is composed of the units 97, 100, 101, 108, 109, 110. The outer bowls of these installation units are designed so strong that, after assembling and connecting said bowls to each other, a supporting housing will be obtained.

The housing 106 is connected to the on-screw surfaces of the flanges 103 and 105. It is to these flanges that, depending on the requirement, also the subsequent transmission 111, 112 may be connected.

The fluid flow transmission of FIG. 9 has two torque converters XXI and XXII and a fluid flow coupling XXIII. Thus, three velocities are possible. The converters XXI, XXII are designed as installation units. Their stationary guide wheel housings 120, 121 are provided with flanges 122, 123 which are screwed to the inner flanges 124, 125 of a one-piece cylindrical transmission housing 126. To the ends of this transmission housing, more specifically to flanges 127, 128, end face plates 129, 130 are connected which close the transmission housing and support the bearings 131, 132 of a central secondary shaft 133. Mounted on these end plates 129, 130, which are of identical construction, are subsequent transmissions, 134, 135.

Furthermore, the transmission housing 126 has mounted thereon flanges 136, 137, 138 which in their turn have connected thereto a housing 139 for the filling pump, an oil sump container 140 and a transmission box 141 for the input gears.

If with the embodiments according to FIGS. 8 and 9, the sizes of the flanges of those parts which are to be connected to each other are equal to each other, it will be evident that a far reaching exchangeability of the individual installation unit and other auxiliary units as for instance the drive input, the filling pump, the oil container etc. will be possible and that by means of a relatively few standardized units, numerous combinations of fluid flow transmissions can be built.

It is, of course, to be understood that the present invention is, by no means, limited to the particular constructions shown in the drawings but also comprises any modifications within the scope of the appended claims.

What I claim is:

1. In a fluid flow transmission comprising a housing having mounted therein at least two coaxially arranged fluid flow machines each comprising a rotatable primary wheel and a rotatable secondary wheel, said fluid flow machines being operable in the same direction of rotation and being respectively designed for different velocity ranges and being adapted to be made effective and ineffective: a hollow primary shaft having said primary wheels connected thereto for rotation therewith, gear means adapted to be drivingly connected to a prime mover and including a gear interposed between two fluid flow machines and drivingly connected to said primary shaft, and a secondary shaft common to said secondary wheels and connected thereto for rotation therewith, said secondary shaft extending through said primary shaft and from one side wall of the housing to the opposite side wall to permit power take off at both ends of the secondary shaft through the respective side walls of the housing.

2. A fluid flow transmission according to claim 1, in which at least one fluid flow machine in addition to comprising a primary wheel and a secondary wheel comprises a guide wheel and in which said secondary wheel of said one machine is located radially outside said primary wheel, said primary and said secondary wheel of said one fluid flow machine being located on that side of said one fluid flow machine which is remote from said gear means.

3. A fluid flow transmission according to claim 1, in which each of said fluid flow machines comprises a housing provided with lateral flanges, an additional housing provided also with lateral flanges and interposed between the housing of the fluid flow machines and comprising said gear means, said gear means including at least said gear and a further gear meshing with said gear and being journalled in said additional housing, all said housings being connected to each other so as to form a stable unitary housing system.

4. A fluid flow transmission according to claim 3, which includes supporting means flanged to the outermost housings of said unitary housing system and comprising the end bearings of said secondary shaft.

5. A fluid flow transmission according to claim 3 in which the housings for said fluid flow machines and the additional housing have flanges of the same diameter for selective connection to each other.

6. A fluid flow transmission according to claim 3, which includes a casing of light construction confining an oil sump and being connected to said housing unit.

7. A fluid flow transmission according to claim 1, in which each of said fluid flow machines comprises a housing provided with lateral flanges, a one-piece substantially cylindrical housing having said fluid flow machines mounted therein and supported thereby, an additional housing being provided with flanges and connected to said cylindrical housing, said gear means including at least said gear and a further gear meshing with said gear and being journalled in said additional housing, said cylindrical housing having its end faces provided with surfaces for selectively connecting thereto additional transmissions.

8. A fluid flow transmission according to claim 7 which includes a casing of light construction confining an oil sump and being connected to said cylindrical housing.

9. In a fluid flow transmission comprising a housing mounted therein, three fluid flow machines arranged coaxially with regard to each other and one behind the other, each of said fluid flow machines comprising a rotatable primary wheel and a rotatable secondary wheel, said fluid flow machines being operable in the same direction of rotation and being respectively designed for different velocity ranges and being adapted to be made effective and ineffective: a hollow primary shaft having said primary wheels connected thereto for rotation therewith, gear means adapted to be drivingly connected to a prime mover and including a gear interposed between two fluid flow machines and drivingly connected to said primary shaft, a secondary shaft having directly connected thereto the secondary wheels of the two outer fluid flow machines for rotation therewith, and an additional hollow shaft surrounding a portion of said primary shaft and having rotatably connected thereto the secondary wheel of the fluid flow machine intermediate said two outer fluid flow machines and having also rotatably connected thereto the secondary wheel of that one of the two outer fluid flow machines which is located on the same side of said gear as said intermediate fluid flow machine, said secondary shaft extending through said primary shaft and from one side wall of the housing to the opposite side wall to permit power take off at both ends of the secondary shaft through the respective side walls of the housing.

10. A fluid flow transmission according to claim 9, in which of the two fluid flow machines located on the same side of said gear, that fluid flow machine which has the greatest distance from said gear is designed as torque converter and provided with a multi-stage secondary wheel.

11. In a fluid flow transmission comprising a housing having mounted therein at least two coaxially arranged fluid flow machines each comprising a rotatable primary wheel and a rotatable secondary wheel, said fluid flow machines being operable in the same direction of rotation and being respectively designed for different velocity ranges and being adapted to be made effective and ineffective: a hollow primary shaft having said primary wheels connected thereto for rotation therewith, gear means adapted to be drivingly connected to a prime mover and including a gear interposed between two fluid flow machines and drivingly connected to said primary shaft, and a secondary shaft common to said secondary wheels and connected thereto for rotation therewith, that fluid flow machine designed for the lowermost velocity range being provided with a two-stage secondary wheel for obtaining a sufficient torque conversion during the starting of the operation of said transmission, said secondary shaft extending through primary shaft and from one side wall of the housing to the opposite side wall to permit power take off at both ends of the secondary shaft through the respective side walls of the housing.

12. A fluid flow transmission according to claim 11, in which the torque converter laid out for the lowermost velocity range also comprises a two-stage guide wheel.

13. In a fluid flow transmission comprising a housing having mounted therein at least two coaxially arranged fluid flow machines each comprising a rotatable primary wheel and a rotatable secondary wheel, said fluid flow machines being operable in the same direction of rotation and being respectively designed for different velocity ranges and being adapted to be made effective and ineffective; a hollow primary shaft having said primary wheels connected thereto for reduction therewith, gear means adapted to be drivingly connected to a prime mover and including a gear interposed between two fluid flow machines and drivingly connected to said primary shaft, a centrally located secondary shaft common to said secondary wheels and connected thereto for rotation therewith, and bearing means for rotating said secondary shaft, said secondary shaft and said bearing means therefor as well as the connection of said secondary wheels with said secondary shaft being located symmetrically to a plane perpendicular to the axis of said secondary shaft whereby said secondary shaft may selectively be used as a power takeoff to either of the two sides of said housing.

14. In a fluid flow transmission comprising a housing having mounted therein at least two coaxially arranged fluid flow machines each comprising a rotatable primary wheel and a rotatable secondary wheel, said fluid flow machines being operable in the same direction of rotation and being respectively designed for different velocity ranges and being adapted to be made effective and ineffective: a hollow primary shaft having said primary wheels connected thereto for rotation therewith, gear means adapted to be drivingly connected to a prime mover and including a gear interposed between two fluid flow machines and drivingly connected to said primary shaft, bearing means at opposite sides of said gear means for rotatably supporting the same, said housing comprising spaced wall means located between said two fluid flow machines and between which wall means said gear is interposed, said wall means supporting said bearing means, and a secondary shaft common to said secondary wheels and connected thereto for rotation therewith, said secondary shaft extending through said primary shaft and through at least one side of said housing for a power takeoff.

15. A fluid flow transmission according to claim 14, in which said wall means form a separate insert adapted as a unit to be inserted into the remaining portion of the housing and designed sufficiently strong to absorb all forces of the respective driving means journalled in said insert.

References Cited in the file of this patent

UNITED STATES PATENTS

| | | |
|---|---|---|
| 2,063,471 | Stedefeld | Dec. 8, 1936 |
| 2,100,440 | Gossler | Nov. 30, 1937 |
| 2,110,741 | Seibold | Mar. 8, 1938 |
| 2,622,712 | Becker | Dec. 23, 1952 |

FOREIGN PATENTS

| | | |
|---|---|---|
| 882,934 | Germany | July 13, 1953 |